Feb. 26, 1952 F. HUDSON 2,587,475
FLEXIBLE LOCKING MEANS FOR BELL AND SPIGOT JOINTS
Filed May 15, 1948 2 SHEETS—SHEET 1
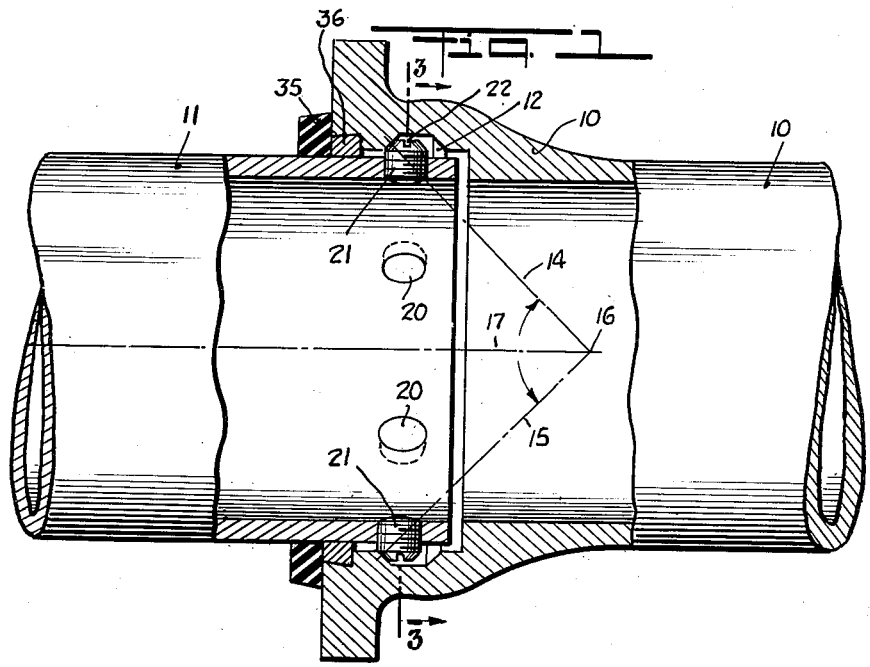
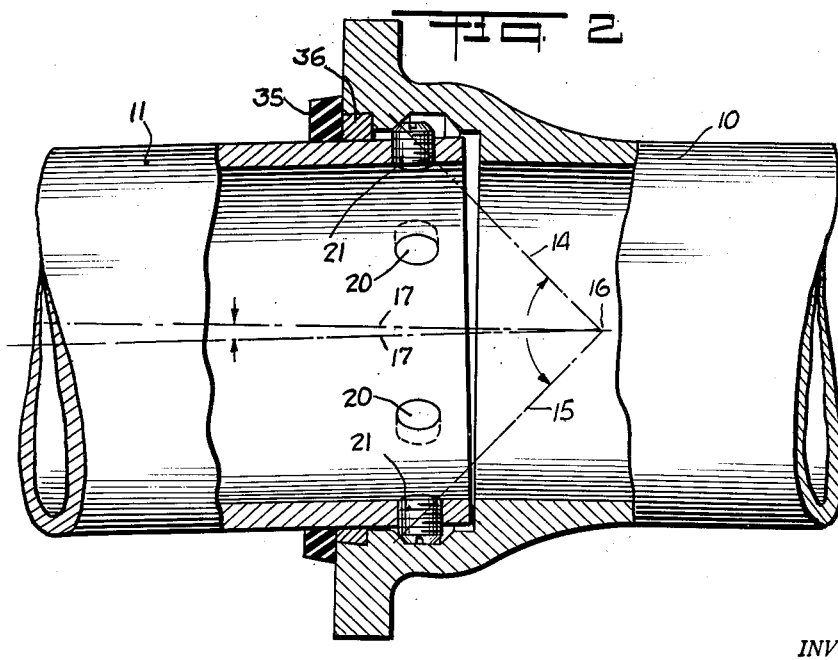
INVENTOR.
Franklin Hudson
BY Mock & Blum
ATTORNEYS

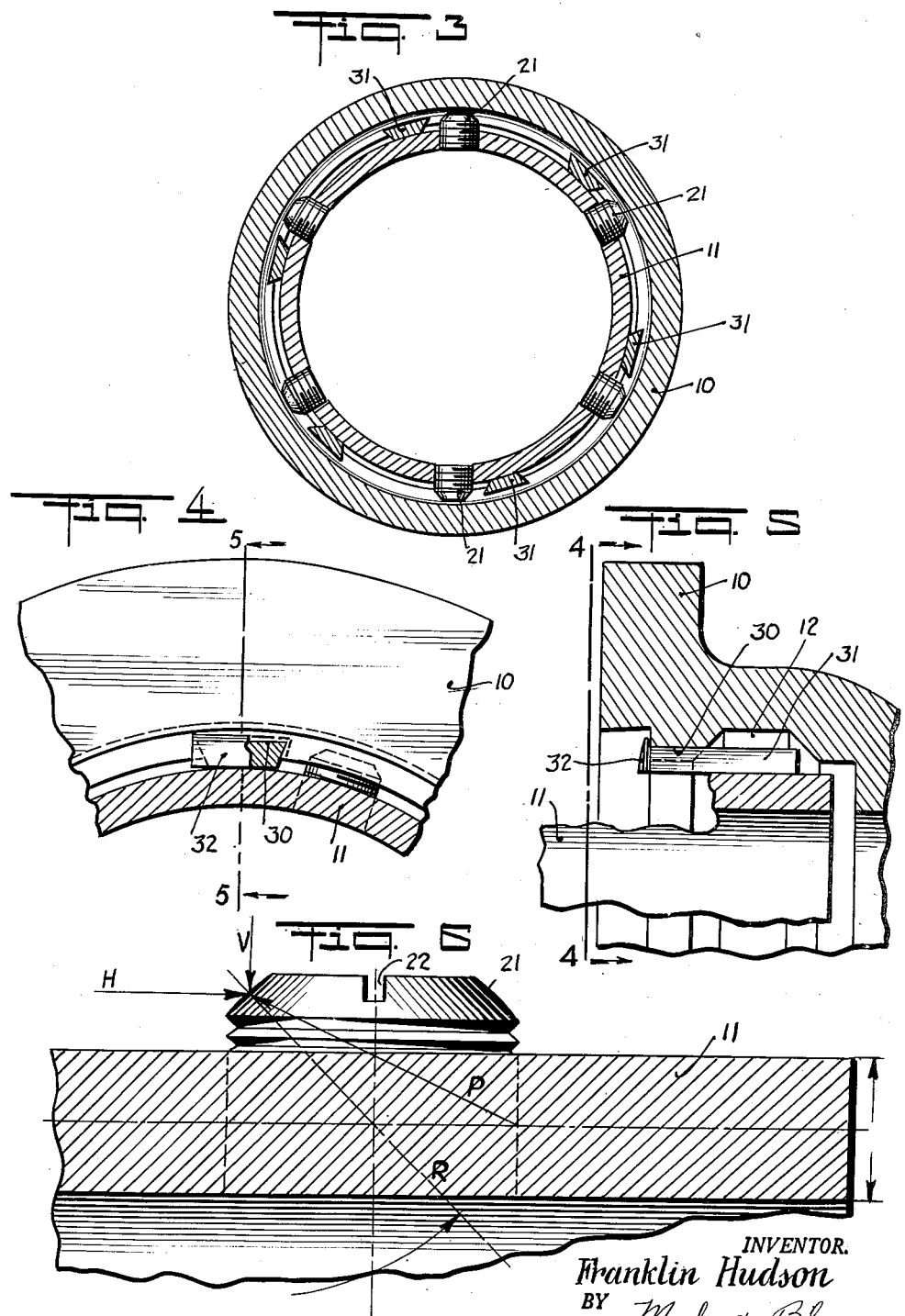

Patented Feb. 26, 1952

2,587,475

UNITED STATES PATENT OFFICE 2,587,475

FLEXIBLE LOCKING MEANS FOR BELL AND SPIGOT JOINTS

Franklin Hudson, Roselle, N. J., assignor to Inner-Tite Clamp Corporation, Elizabeth, N. J., a corporation of New Jersey Application May 15, 1948, Serial No. 27,255

5 Claims. (Cl. 285—175)

This invention relates to a flexible locking means for bell and spigot joints.

The principal object of this invention is the provision of a flexible locking means of the character described which possesses great uniform strength irrespective of the relative positions of the bell and spigot members. In other locking means used in connection with bell and spigot joints there is a weakening of the locking means as the two pipe members are moved out of axial alignment with each other the extent of its weakening being proportionate to the extent of disalignment. The advantages of the present locking means over the conventional are apparent.

Another object of this invention is the provision of a locking means as described which includes a plurality of adjustable studs in the spigot member, positioned to engage a locking channel in the bell member. In other locking mechanisms of this general character the studs are not adjustable and hence expensive machining is required to properly fit the studs into the locking channel.

Still another object of this invention is the provision of a locking means as described which is exposed to the internal pressure of the pipe system. In conventional locking means of this general character a gasket or gaskets provide a seal between the inside of the two pipe members and the locking means. Excessive stresses are thereby set-up in the conventional joint since the internal and external pressures in the stud area are different whereas in the construction herein claimed, the internal and external pressures in the stud area are identical.

A corollary object of this invention is the provision of a flexible joint of the character described, in which elastic, resilient gaskets are provided at the outer end of the bell member, thereby sealing the inner end of the spigot member and the entire locking means into the internal pipe system. As has above been indicated conventional pipe joints of this general type make use of an internal gasket which is positioned at the innermost end of the spigot member, thereby sealing the entire locking means area out of the internal pipe system.

A still further object of this invention is the provision of an adjustable stud for flexible bell and spigot joints.

A preferred form of this invention is shown in the accompanying drawing in which:

Fig. 1 is a fragmentary, partly sectional view of a flexible bell and spigot joint incorporating the features of this invention, the bell and spigot members of said joint being shown in axial alignment with each other;

Fig. 2 is a view similar to that of Fig. 1 showing the bell and spigot members out of alignment with each other;

Fig. 3 is a transverse section on the line 3—3 of Fig. 1;

Fig. 4 is a fragmentary, detailed view of the bell end of the joint, said view being partly in section on the line 4—4 of Fig. 5;

Fig. 5 is a section on the line 5—5 of Fig. 4; and

Fig. 6 is an enlarged view, in section, of a fragment of the spigot member wall, showing a detailed view of the head and bearing surface of one of the adjustable studs mounted in said member.

The flexible joint herein claimed includes a bell member 10 and a spigot member 11. As is conventionally the case, the dimensions of the bell member are such as to enable said member to accommodate the inner end of the spigot member 11.

An annular groove 12 is formed on the inside of bell 10. The important bearing surface of said groove is that surface which lies adjacent the outer end of the bell. It will be noted both in Fig. 1 and Fig. 2 that it is this bearing surface which is alone involved in the locking engagement between the bell and spigot members. This important bearing surface is spherical in curvature, two radii 14 and 15 being described in Fig. 1 to indicate where imaginary center point 16 lies. It will be noted that this central point 16 is located on the central axis 17 of bell member 10. It will be noted in Fig. 2, and it will be hereinafter more fully seen, that the pivotal movement between the bell and spigot members is on a pivot which coincides with, or intersects center point 16.

The annular groove last above described constitutes the locking channel of the bell member 10 and it may be cast or formed into said bell member in the same casting or forming operation which produces the bell member itself. For reasons which will hereinafter shortly appear, this locking channel need not normally be machined. If exceedingly close tolerances are to be observed, machining would be in order.

The spigot member 11 is provided with a plurality of tapped, spaced, radially extending holes 20. These holes are arranged on a common circumferential line. In each hole is a stud 21 which is provided with external screw threads adapting it to enter the tapped hole.

Each stud 21 is provided with a slot 22 which is adapted to receive the blade of a screw driver. It is by this means that the several studs 21 may be installed in their respective tapped holes 20 to any predetermined or selected depth. Close examination of the exposed head of stud 21 as shown in Fig. 6 will disclose the fact that a convex surface of a frustum of a circular spindle is thereon provided. The radius of the imaginary sphere whose curvature corresponds to the curvature of stud 21 is identical with radii 14 and 15 of the spherical bearing surface formed in locking channel 12. Hence the curvature of the head of each stud 21 corresponds to the curvature of said bearing surface in the locking channel.

It will be seen in Figs. 1, 2 and 3 that the spindle heads of studs 21 extend into locking channel 12 to lock the bell and spigot members together. The studs are shown in unbroken contact with the curved bearing surface of the locking channel and it will be understood that all of the studs remain in unbroken contact therewith irrespective of the relative positions of the bell and spigot members. It will be remembered that the studs are adjustably mounted in spigot 11 and it will therefore be appreciated that they may be adjusted in either axial direction to provide for such unbroken bearing contact at all times. It is this adjustability feature that lessens the need for accurate machining both of the studs as a group and of the locking channel which they engage. Each stud should, of course, be machined to true dimensions, but this is a relatively simple proposition. There is no need, as is clearly the case with other locking members of this general type, to machine all of the studs at the same time to insure true concentricity and spherical curvature.

It will be apparent from an examination of Figs. 1 and 2 that an axial load or force tending to pull the joint apart may be exerted thereon. It is by reason of this axial force that the bearing surfaces of the several studs are maintained in unbroken contact with the bearing surface above described of the locking channel. This axial force is normally encountered where bell and spigot joints are employed. It may be the case however that an axial force tending to push the two joint members together will, under certain circumstances and conditions also be encountered. It may be found desirable therefore to anticipate such contingency by providing a pair of spherical bearing surfaces in the locking channel of the bell member. The additional bearing surface will resemble the bearing surface shown in the drawing in every respect except that its central point will lie on an imaginary axial line projected along the central axis of the bell member, outwardly therefrom. Sufficient clearance between the two joint members is provided to enable them to move pivotally relative to each other on a pivot coinciding with the central point of said additional spherical bearing surface. No change in the structure of the studs need be incorporated therein since the spindle shaped head portions which are adapted to enage either bearing surface of the locking channel are provided.

Reference to Fig. 6 will disclose the fact that the spherical radius of each stud 21, indicated by the line marked R is so located that at all times and for all positions of the joint, the resultant force, indicated by the arrow marked P, caused by the applied horizontal or axial force indicated by the arrow marked H, and the vertical or radial force indicated by the arrow marked V, will induce compressive and shearing stresses only in each stud and on the semi-circumferential bearing area of the threaded portion of the pipe wall. It will be understood that this constitutes a vastly improved way of transmitting the axial force which is exerted upon the two joint members, from the spigot end of the pipe through the studs to the bell of the pipe.

In order to provide access for studs 21 to locking channel 12, longitudinally extending slots 30 are formed in bell member 10. These slots are spaced to correspond to the spacing of studs 21 in spigot member 11 and it will be understood that these slots 30 communicate with locking channel 12 and are sufficiently large to enable said studs 21 to pass longitudinally through them into said locking channel. When the studs enter the locking channel the two pipe members are turned relatively to each other on their respective central axes and the stud members are thereby brought out of registration with said slots 30. To prevent the studs from moving back into registration with said slots, slot keys 31 are provided in said slots. These slot or locking keys are inserted into the slots to prevent the studs from slipping out of the locking channel through said slots.

It will be noted, especially in Figs. 3 and 4 that in cross-section both the slots and the slot keys resemble a dove-tail, the wider portion thereof being radially farther from the central axis of the bell pipe member than the smaller or narrower portion. This dove-tail shape both of the slots and of the keys prevents radial movement or displacement of the keys in the direction of the spigot member. It is to prevent interference on the part of said keys with the relative movements of the bell and spigot members that the keys and their respective slots are so shaped. Each key is provided with a shoulder portion 32 which is too large to enter the key slot. This shoulder portion serves as a stop for the key, determining its depth of insertion into the slot and it also affords the means of removing the key from the slot when removal thereof is desired.

Six studs are shown in the drawing and also six keys. Six is not a critical number either for the studs or for the keys. The number of studs used will be determined by many factors and considerations. Broadly speaking, it may be said that the greater the axial load on the joint, the greater the number of studs will be indicated. The size and strength factors of each stud and their location on the spigot end of the pipe will also be considerations to be borne in mind by the engineer. The number of keys need not correspond to the number of studs. It has been found that a minimum of two keys should be employed for best results.

It will be seen in Figs. 1 and 2 that a primary seal 35 and a secondary seal 36 are applied to the bell end of the joint. An annular groove or recess is formed along the inner peripheral edge of the outer end of bell member 10. This annular groove or recess accommodates secondary seal 36 which comprises a guard ring of lead or other satisfactory material. It will be noted that the circumferential wall of groove 37 is not parallel to the outer wall surface of spigot 11. A modified dove-tail recess or channel is thereby formed between the walls of the annular groove and the outer wall surface of the spigot. Guard ring 36 is shaped by calking or other means to occupy said recess and hence it will be apparent that there will be no danger of said ring slipping out of its recess. The primary seal 35 occupies a position immediately outside of groove 37. It is contiguous therefore with secondary seal 36 along the full length thereof. The primary seal is an elastic, resilient gasket. It may be held in place by reason of its inherent elasticity and resilience and also by means of an adhesive or other mechemical means may affix it both to the bell member and to the spigot member as well as to the secondary seal 36, to provide a leak-proof dam.

The foregoing is a description of a preferred form of this invention and it will clearly be understood that modifications and variations may be incorporated therein within the broad scope and spirit of the invention. For example, the specific type of material which is used in making the two joint members, the studs, the locking keys and the two seals, will be determined by the individual requirements of each case. The dimensions of the several members will also be determined by the individual requirements of each case.

I claim:

1. A flexible bell and spigot joint, comprising a bell member and a spigot member extending into said bell member, said bell member having an annular locking channel formed therein and a plurality of longitudinally extending slots communicating with said channel and providing access thereto, said spigot having a plurality of radially adjustable studs mounted therein, said studs and said slots being correspondingly spaced to enable said studs to pass through said slots and into said locking channel, a plurality of locking keys being provided for at least some of said slots to prevent the studs from slipping out of the locking channel.

2. A flexible joint in accordance with claim 1 in which the slots and their respective keys are dove-tailed in cross-section to prevent radial displacement of said keys in and from their said slots.

3. A joint in accordance with claim 1 in which the mutually contacting surfaces of the locking channel and the studs are spherical in curvature, the spherical center being in the bell member, on its central axis.

4. A flexible joint in accordance with claim 1 in which a seal is provided between the bell and spigot members, said seal comprising an elastic, resilient gasket mounted at the end of the bell member, in contact with the outer wall of the spigot member.

5. A flexible bell and spigot joint, comprising a bell member and a spigot member loosely accommodated thereby to allow for relative pivotal movement therebetween, said bell member having an annular locking channel formed therein, said spigot member having a plurality of radially adjustable studs mounted thereon and extending nito the locking channel to lock the bell and spigot members together, said locking channel being provided with a spherical bearing surface in front of the studs and with a spherical bearing surface behind said studs, said studs being provided with spherical bearing surfaces with which to engage the spherical bearing surfaces of the locking channel, the diameter of said studs being smaller than the width of the locking channel to allow for relative pivotal movement between the bell and spigot members.

FRANKLIN HUDSON.

REFERENCES CITED

The following references are of record in the file of this patent:

UNITED STATES PATENTS

| Number | Name | Date |
| --- | --- | --- |
| 374,557 | Riley | Dec. 6, 1887 |
| 562,892 | Gates et al. | June 30, 1896 |
| 2,415,753 | Newell | Feb. 11, 1947 |

FOREIGN PATENTS

| Number | Country | Date |
| --- | --- | --- |
| 12,799 | Great Britain | June 20, 1899 |